United States Patent [19]

Mathes et al.

[11] Patent Number: 4,662,151
[45] Date of Patent: May 5, 1987

[54] MACHINE FOR WRAPPING ROLLED BALES WITH A PLASTIC SHEET

[75] Inventors: Arnold Mathes; Lester C. Hite, both of Pella, Iowa

[73] Assignee: Vermeer Manufacturing Co., Pella, Iowa

[21] Appl. No.: 909,184

[22] Filed: Sep. 19, 1986

[51] Int. Cl.⁴ .............................................. B65B 11/04
[52] U.S. Cl. ...................................... 53/587; 53/118; 53/211
[58] Field of Search ................. 53/556, 587, 118, 211; 100/15

[56] References Cited

U.S. PATENT DOCUMENTS

| | | | |
|---|---|---|---|
| 4,173,112 | 11/1979 | Meiners | 53/118 X |
| 4,216,640 | 8/1980 | Kaufman | 53/556 X |
| 4,232,501 | 11/1980 | Stackhouse | 53/556 X |
| 4,343,132 | 8/1982 | Lawless | 53/587 X |
| 4,409,784 | 10/1983 | Van Ginhoven | 53/118 |
| 4,606,172 | 8/1986 | Miller | 53/587 X |

FOREIGN PATENT DOCUMENTS 2159489 12/1985 United Kingdom .................. 53/211

*Primary Examiner*—John Sipos
*Attorney, Agent, or Firm*—Rudolph L. Lowell

[57] ABSTRACT

The round bale wrapping machine is tractor operated and is equipped with a rotatable platform to support the bale in an upright position for rotation about a vertical axis. The machine supported bale is located adjacent a wrapping mechanism which automatically wraps a plastic sheet material about the bale under the control of the tractor operator. The plastic sheet material is of a roll form rotatably carried on an upright arm at a fixed location on the machine frame. The wrapping mechanism is movably supported on the machine frame for selected movement with and relative to the rotatable platform and to the plastic roll and operates to automatically complete a first plastic wrap around the bale with the lead end of the plastic sheet pressed against the bale periphery at a position to be covered by a second wrap of the plastic sheet about the bale. On completion of the second wrap, the plastic sheet is automatically severed concurrently with the retention or holding of the resulting or new lead end of the plastic roll in a position to first wrap a next bale. The wrapped bale is then removed from the machine and ground supported on the side thereof having the overlapped terminal ends of the two plastic wraps.

7 Claims, 18 Drawing Figures

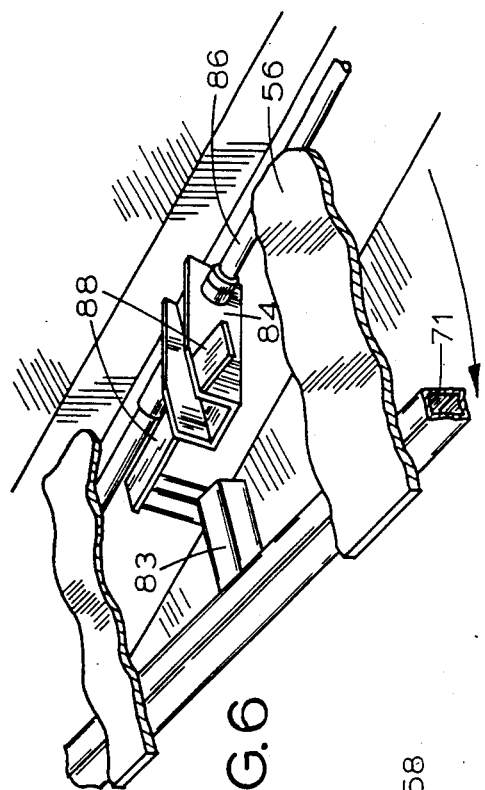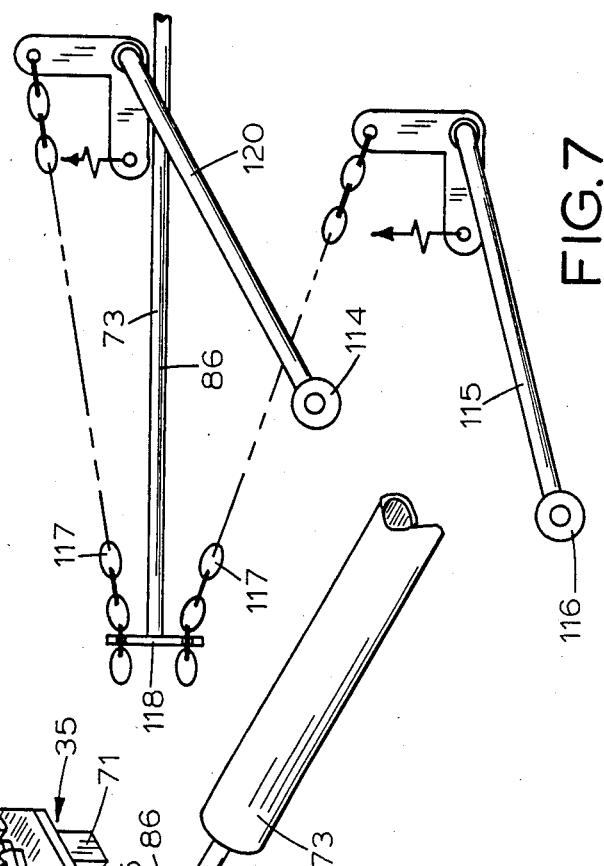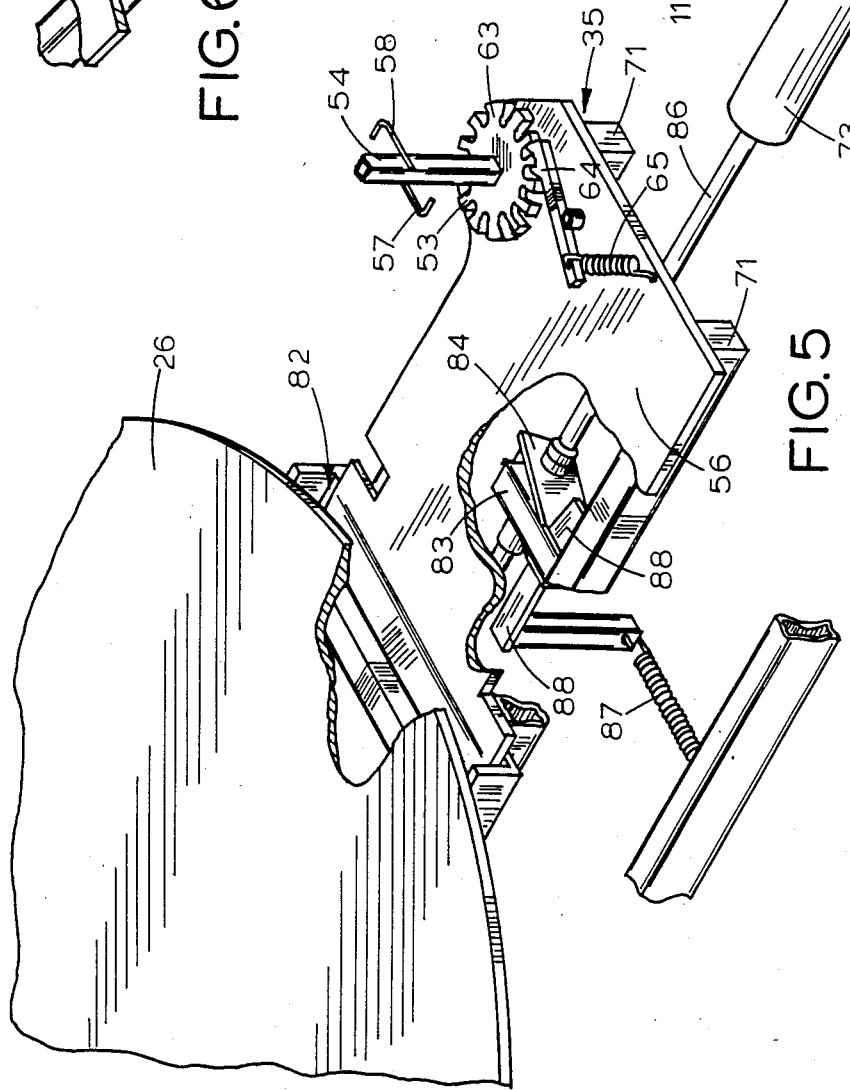

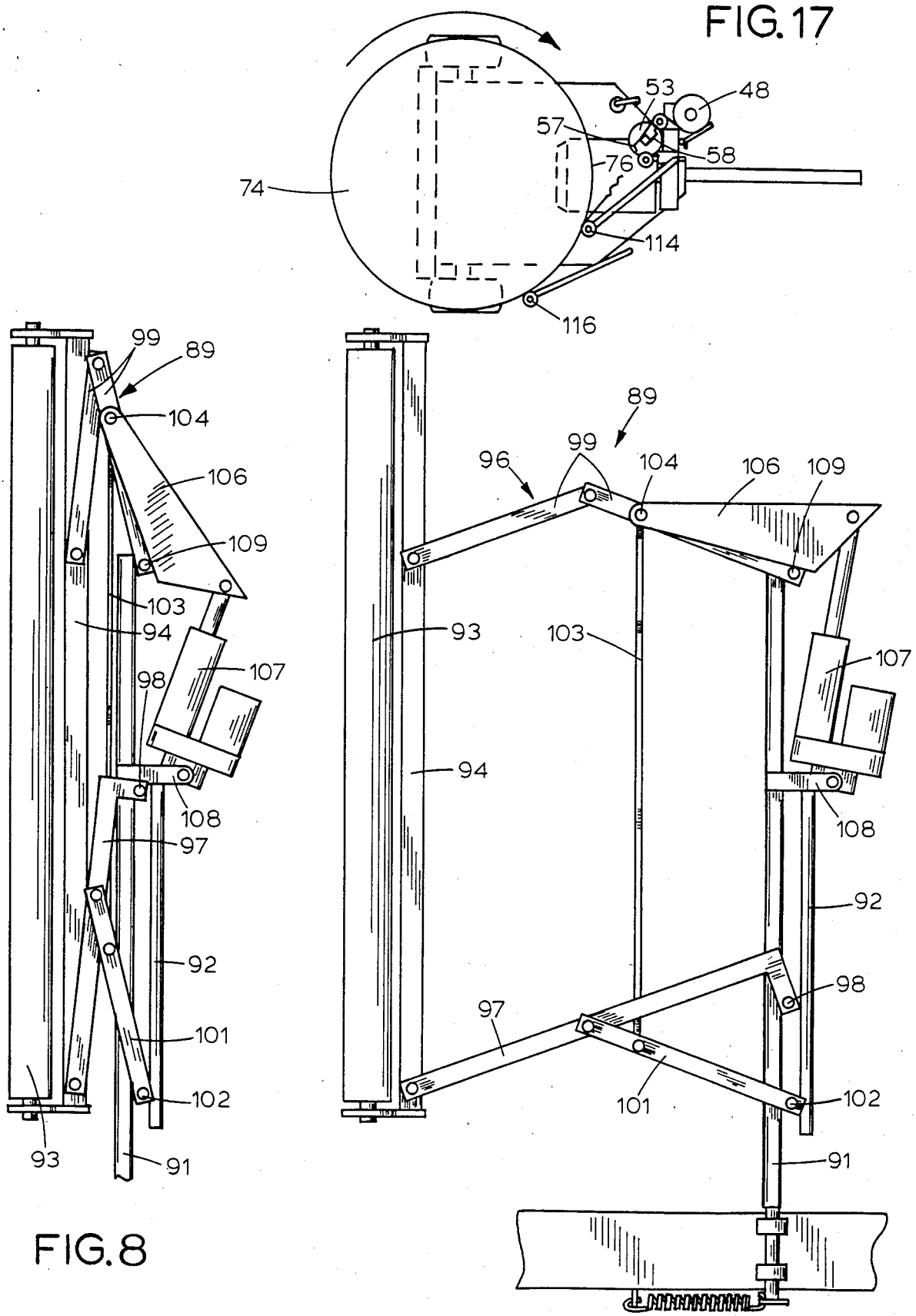

MACHINE FOR WRAPPING ROLLED BALES WITH A PLASTIC SHEET

BACKGROUND OF THE INVENTION

In the harvesting of a forage crop material, the material after being cut, is generally permitted to dry at least to a limited extent and then formed into windrows. The windrows are then made up into rolled tight bales each of which is usually secured by binder twine extended spirally around the bale. One advantage of rolled bales is that they may be stored in the field since their cylindrical form provides a natural means to shed water when rained upon. However, the outermost portions of such rolled bales may deteriorate if left exposed over a period of time.

To reduce such deterioration, the bales may be protected by a covering material such as sheet plastic, as disclosed in U.S. Pat. No. 4,173,112. In the German published application No. 2,705,101, filed Nov. 23, 1978, a rolled bale is wrapped in plastic material of a ribbon form which is wound spirally around the bale with the edges thereof in an overlapping relation. The wrapping of packages or stacked items by a plastic sheet material is shown in U.S. Pat. Nos. 3,514,920; 3,986,611; and 4,299,076. In U.S. Pat. No. 4,409,784 the bale is wrapped with a plastic sheet material immediately upon being formed in a baling machine.

In U.S. patent application Ser. No. 06/752,655, filed July 8, 1985, there is disclosed a tractor operated bale wrapping machine that is movable from bale to bale in a harvested field and adapted to lift the ground supported bale to an upright position on a platform rotatable about a vertical axis. An upright roll of plastic film, carried adjacent the rotatable platform, is wrapped about the bale during its rotation on the platform. The wrapping operation is performed manually so as to require two men for such operation unless the tractor operator, while the tractor engine and power take-off are in operation, dismounts to perform the manual wrapping operation.

The present invention is an improvement over known bale and package wrapping machines and in particular over tractor operated bale wrapping machines by providing for an automatic wrapping of the bale controlled by the tractor operator while seated on the tractor.

SUMMARY OF THE INVENTION

The tractor operated bale wrapping machine of this invention is of an economical construction and efficient in operation to automatically wrap round bales of varying diameters in a minimum of time. With the bale supported in an upright predetermined position on a rotatable platform for rotation about a vertical axis, an upright roll of plastic material adjacent the platform is operatively associated with a combination plastic holding and severing unit that: initially automatically carries the free end of the plastic roll for a first wrap about the bale; positions such free end on the bale to underlie a second wrap about the bale; and then severs the plastic sheet material on completion of the second wrap. The handling of a ground supported bale onto and removal from the machine, and the rotation of the bale and operation of the combination unit, during the bale wrapping operation, all take place automatically and under the control of the operator seated on the tractor.

BRIEF DESCRIPTION OF THE DRAWINGS

FIG. 5 is an enlarged detail perspective view showing the latch mechanism in position for connecting the carriage member for rotation with the platform, with certain parts broken away for clarity;

FIG. 6 is an enlarged detail perspective view, with parts broken away, showing the latch mechanism of FIG. 5 in its released position;

FIG. 7 is a diagrammatic perspective view of a pair of press rollers which form a part of the wrapping mechanism;

FIG. 8 is a side elevational view of an extendible and retractible pressroll assembly, shown in retracted position, for removing the plastic sheet material from the combination unit on completion of a first wrap about a bale;

FIG. 9 shows the press roll assembly of FIG. 8 in its extended position;

FIGS. 14, 15, 16 and 17 show schematically the operation of the machine to wind a second wrap about a bale and to prepare the plastic sheet to provide for the automatic wrap of a next bale.

DETAILED DESCRIPTION OF A PREFERRED EMBODIMENT

Figure 1:
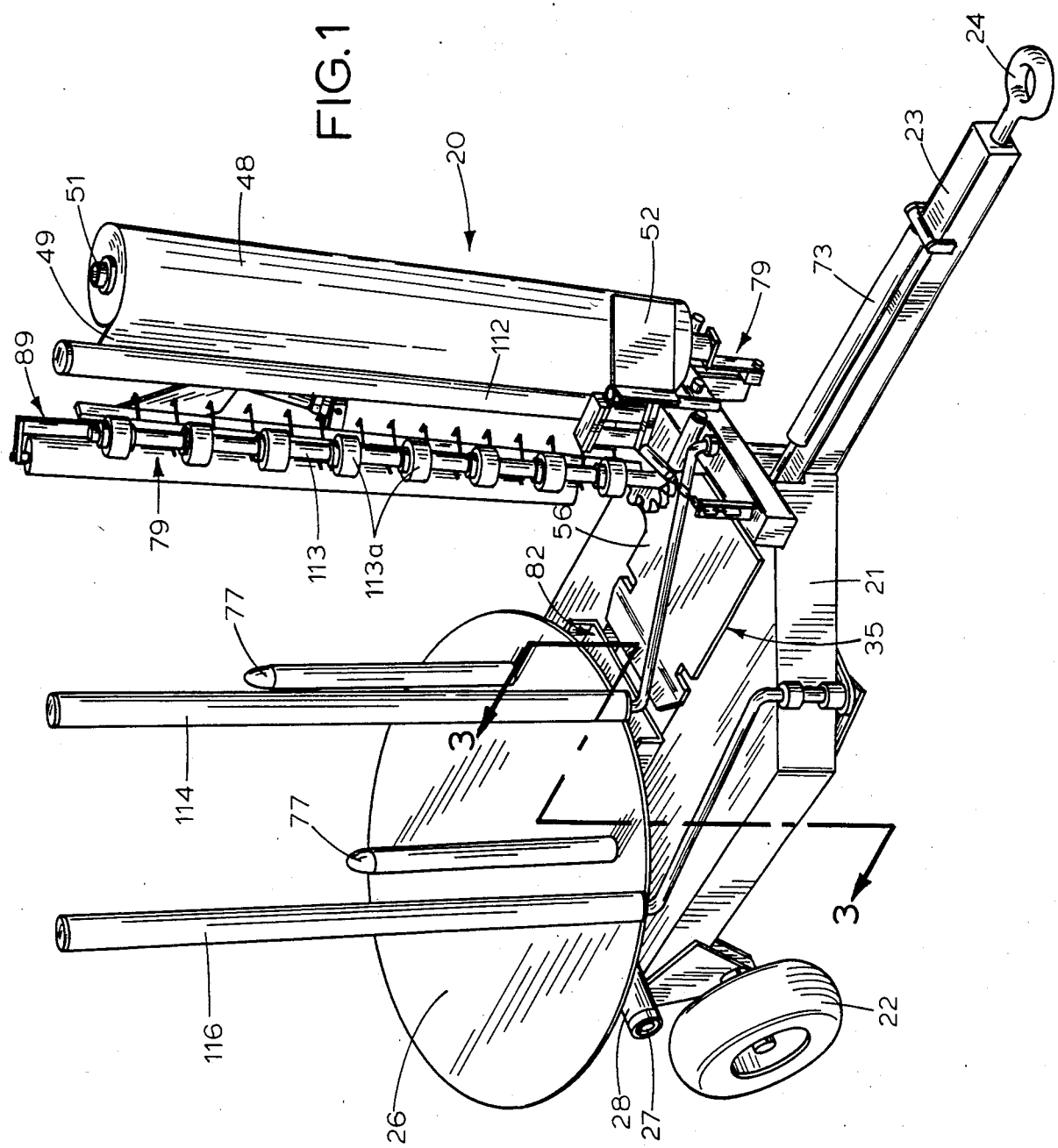
FIG. 1 is a perspective view of a portable bale wrapping machine of the present invention wherein a rotatable bale supporting platform is in a horizontal bale wrapping position.
Figure 2:
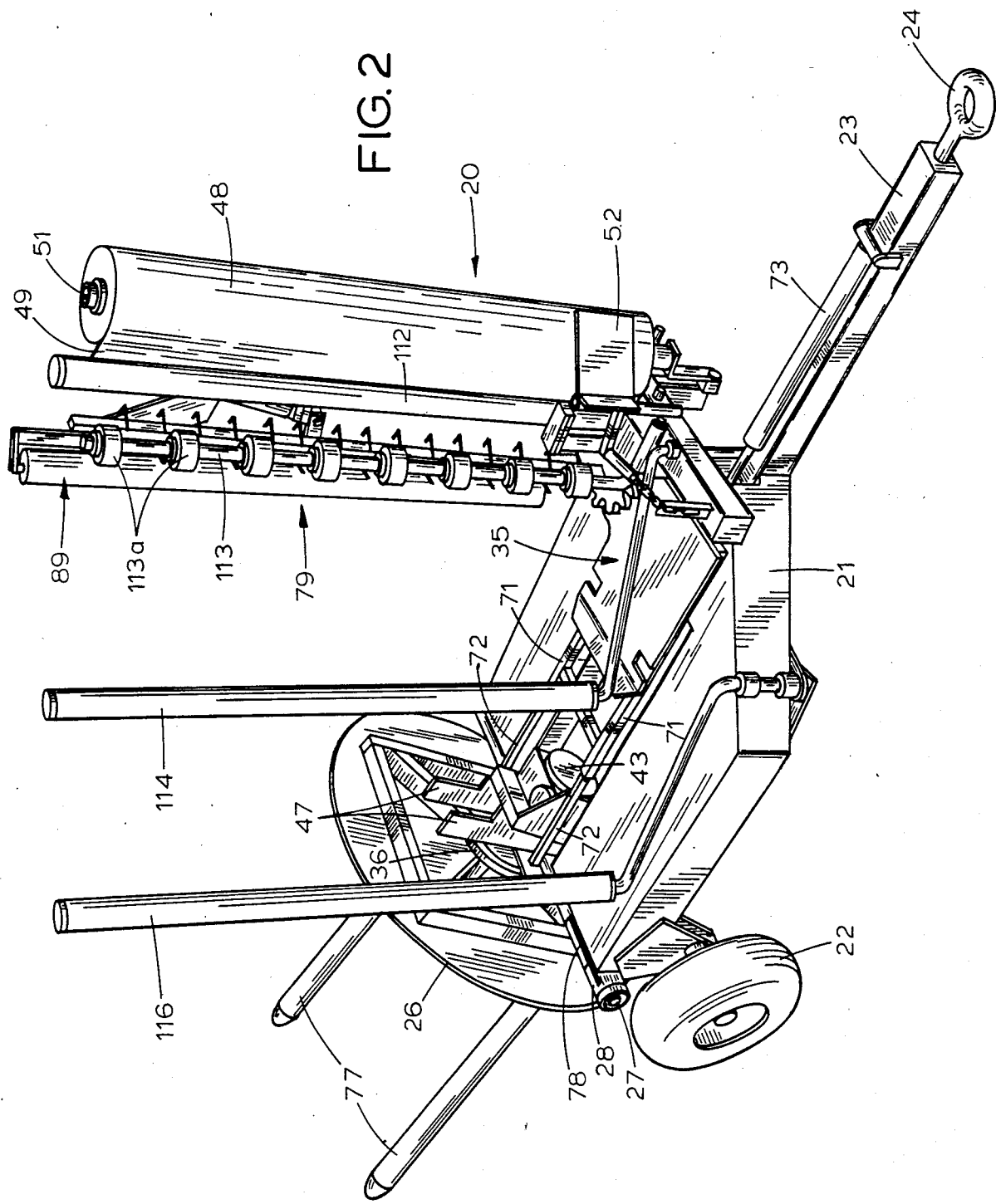
FIG. 2 is a perspective view of the bale wrapping machine wherein the platform is rotated to a vertical bale loading position.

Illustrated in FIG. 1 generally at 20 is an automatic bale-wrapping machine of the present invention which includes a portable main frame 21 supported on a pair of ground wheels 22 and adapted to be towed by a tractor (now shown) by way of a tongue structure 23 which projects forwardly of the frame 21 and terminates in a pintle ring 24. A rotatable platform 26 has a rock shaft 27 on its underside journaled in bearings 28 mounted at the rear end of the frame 21 for pivotal movement of the platform between a vertical bale-loading position (FIG. 2) and a horizontal bale-wrapping position (FIG. 1). Tilting or rocking of the platform 26 between the vertical and horizontal positions therefor is accomplished by a double acting hydraulic cylinder assembly 29 (illustrated schematically in FIG. 18) that is suitably connected to a rock arm (not shown) on the rock shaft 27.

Figure 3:
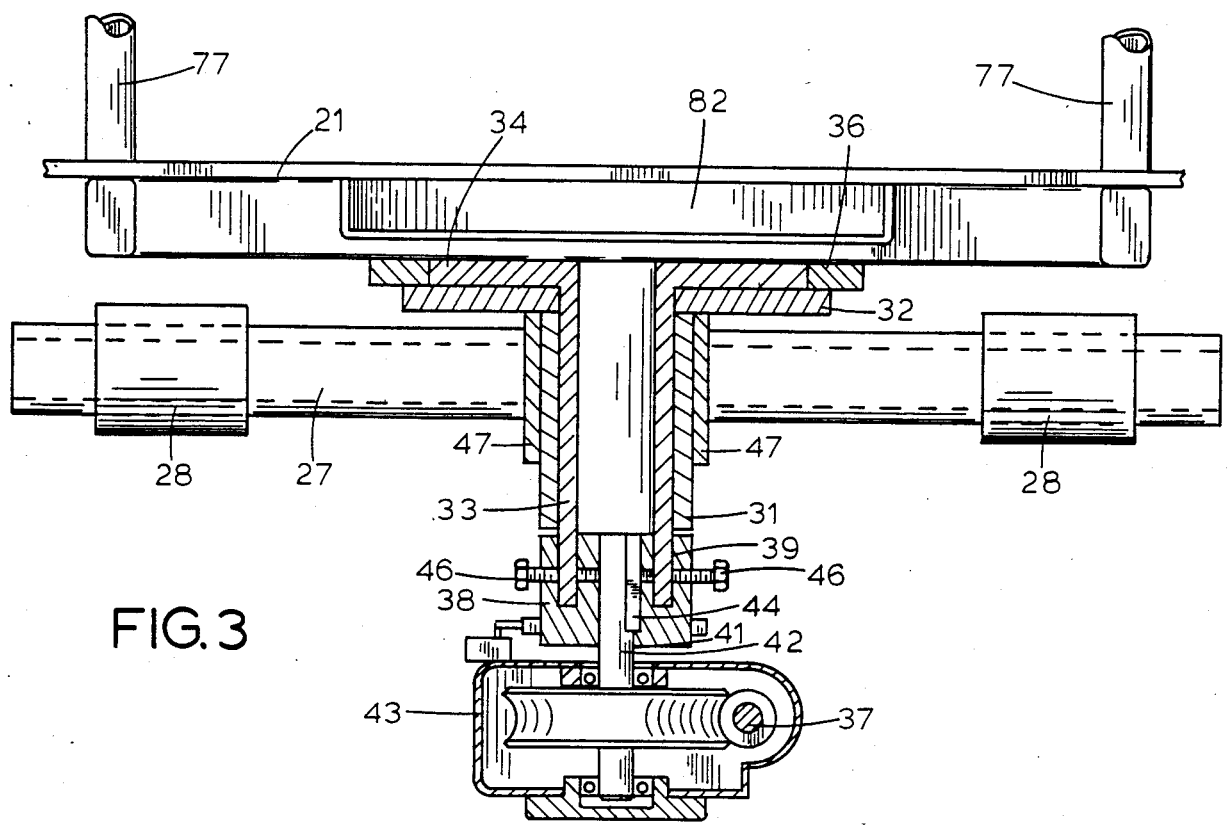
FIG. 3 is a sectional view taken generally along line 3—3 in FIG. 1 showing the hydraulic drive motor, gear reduction unit, and rotatable platform.

The platform 26 is rotatably supported on the main frame 21 by means including a tubular housing 31 (FIG. 3) having at one end an annular flange 32 hereinafter to be referred to as a bearing plate. Rotatable within the tubular housing 31 is a tubular shaft 33 that is provided at one end with a circular base member 34 which is suitably secured to the underside of the platform for full bearing support on the bearing plate 32. A retaining or slip ring 36 secured to the outer peripheral portion of the bearing plate 32 functions as a slip ring with respect to a carriage structure 35 to be later described.

The tubular shaft 31 is connected to a hydraulic motor 37 (FIG. 18) by means including a coupling member 38 (FIG. 3) of a cylindrical shape that is formed with an annular groove 39 for receiving the end of the tubular shaft 33 remote from the base plate 34. Projected within an axial bore 41 in the coupling member is an output shaft 42 of a gear reduction unit 43. The output shaft is connected to the coupling member by a key 44 and set screws 46 which are threadable radially through the coupling member 38 and the tubular shaft 33 for frictional engagement with the output shaft 42 of the reduction unit. The tubular shaft 33 and the output shaft 42 of the reduction unit are thus rigidly secured in axial alignment for rotation as a unit. The tubular housing 31 is rigidly secured to a pair of upright mounting plates 47 carried on the underside of the platform 26 and arranged to opposite sides of the tubular housing.

The forward end of the main frame 21 (FIGS. 1 and 2) has a roll 48 of a plastic sheet material 49 carried on an upright shaft 51 rotatably supported at its lower end on the main frame 21. A free unwinding of the sheet material is prevented by an adjustable brake 52 frictionally engagable with a peripheral portion of the plastic roll 48. The carriage structure 35 (FIG. 5), previously referred to, rotatably carries a combination unit 53 that includes an upright rod 54 rotatably mounted on a slide member 56 that is reciprocally movable on the main frame 21 toward and away from the platform 26 when the platform is in the horizontal position in FIG. 1. The rod 54 is provided with a pair of transversely opposite rows of fingers 57 and 58, with the fingers 57 to be hereinafter referred to as plastic retaining fingers, and the fingers 58 as plastic severing fingers.

Figure 4:
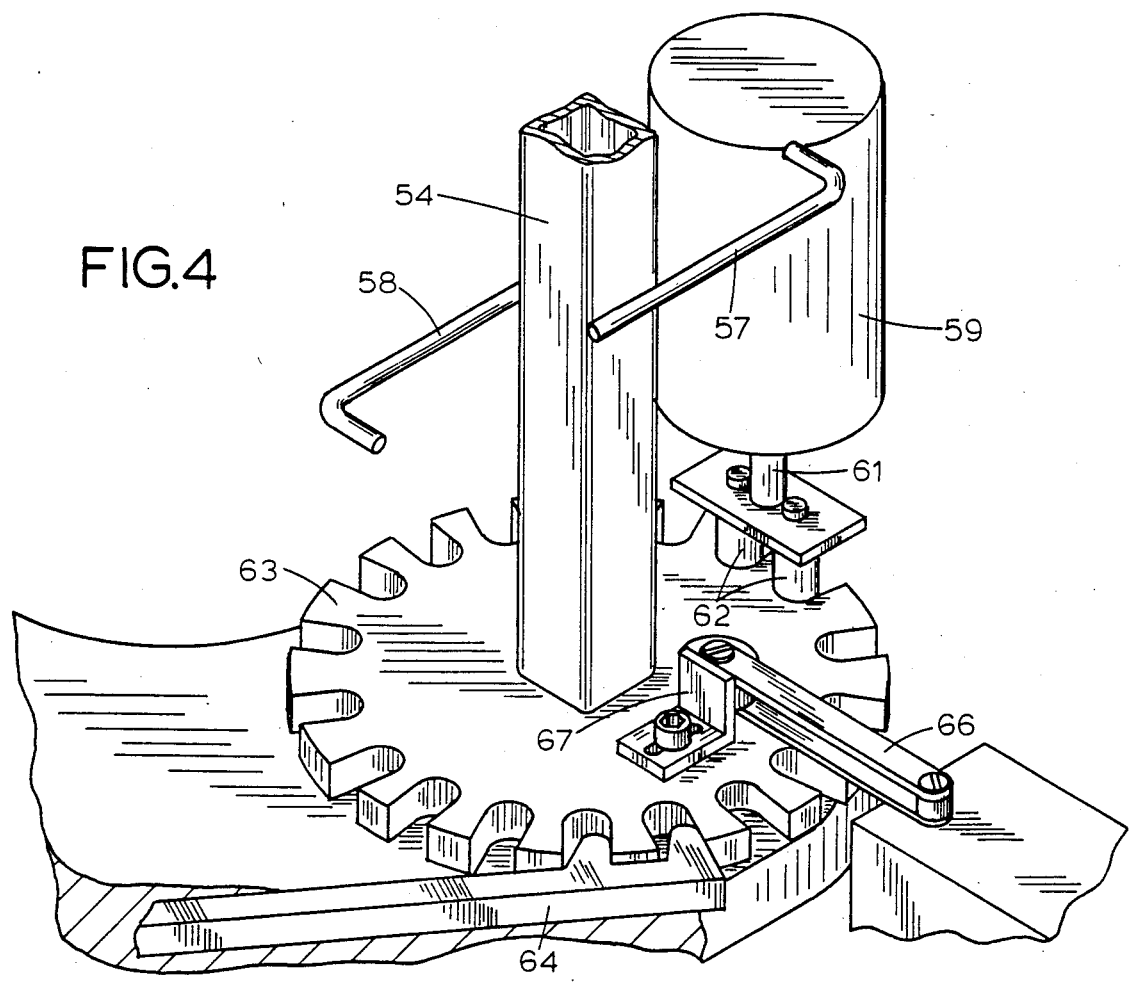
FIG. 4 is an enlarged detail perspective view of the drive mechanism for the combination unit.

Rotation of the rod 54 (FIG. 4) is accomplished by an electric motor 59 having an output shaft 61 to which a pair of drive pins 62 are attached. Secured to the base of the rod 54 is a drive gear 63 which is engaged by the drive pins 62 for rotation in a counterclockwise direction when viewed from above. Clockwise rotation of the drive gear 63 and rod 54 is prevented by a holding pawl 64 which is held in contact with the drive gear 63 by a spring 65 attached between the slide member 56 and holding pawl 64.

The underside of the flat slide member 56 (FIG. 2) supports a pair of transversely opposite tubular members 71 which are in a telescopic relation with corresponding guide rods 72 the free ends of which are pivotally connected to the slip ring 36 on the tubular housing 31. The slide member 56 is reciprocally moved longitudinally of the main frame 21 by a double acting cylinder assembly 73 into and out of an engaged position with the bale platform 26. The slide member 56 is engaged with the platform for rotation therewith only when a first wrap of the plastic sheet material 49 is placed about a bale as will now be described.

Figure 10:
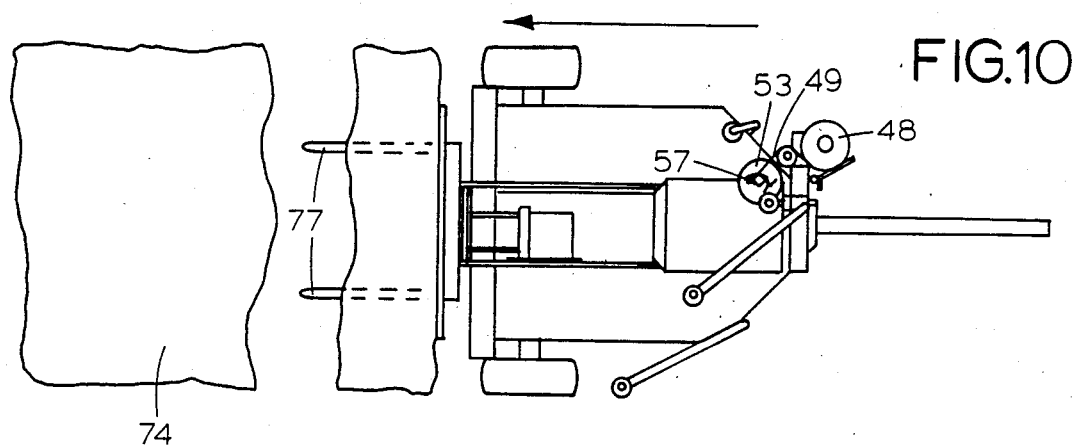
FIGS. 10, 11, 12 and 13 are diagrammatic illustrations showing in sequence the operation of the machine to wind a first wrap about a bale.

A bale 74 (FIG. 10) to be wrapped is generally supported on the ground on one side thereof which for convenience will be hereinafter referred to as the ground side 76 (FIG. 11) of the bale. The tractor is manipulated to position the wrapping machine in longitudinal alignment with the ground bale. With the platform in its tilted position of FIG. 2 the machine is pushed rearwardly by the tractor for the insertion into the bale 74 of a pair of transversely opposite supporting tines 77. The vertical position of the platform is visually observable by the tractor operator by means of indicating lines 78 (FIG. 2) on the rock shaft 27 and bearings 28 therefor. In this respect it is to be noted that the tines 77 will always be at a predetermined distance from the ground so as to provide for the ground side 76 of the bale being at such predetermined distance from the axis of rotation of the platform. As will appear later, the plastic wrapping mechanism 79, comprised of the combination unit 53 and a press roll assembly 89, will thus always be in the same position relative to the ground side 76 in a wrapping operation, regardless of the diameter of the bale to be wrapped.

Figure 11:
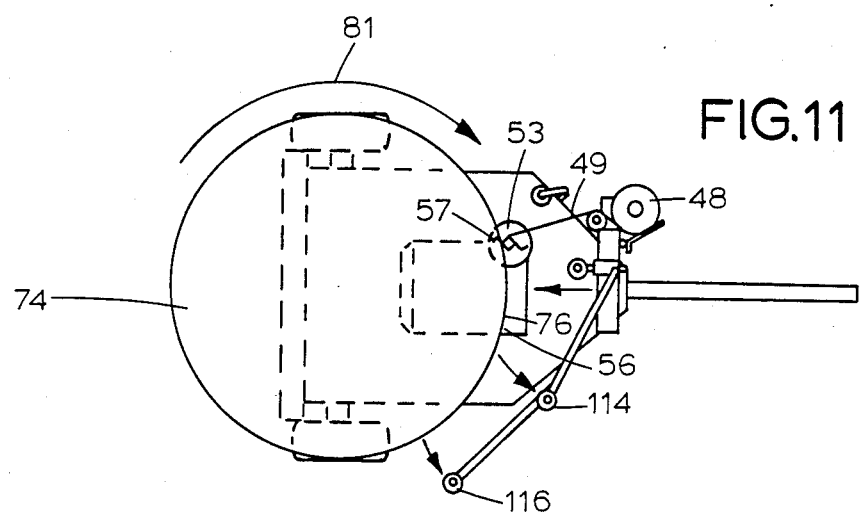

With the bale 74 carried on the tines, the platform 26 is tilted to its horizontal position (FIG. 1). During this loading of a bale the carriage structure 35 is located at the forward end of the main frame. The platform is then initially rotated a half a revolution in the direction indicated by the arrow 81 in FIG. 11 from its initial loaded position to locate the ground side 76 of the bale opposite the wrapping mechanism. The cylinder assembly 73 is then actuated to move the slide member 56 with the combination unit 53 thereon into engagement with the platform for rotation therewith as shown in FIG. 11.

This engagement takes place when the slide member is aligned radially of the platform axis of rotation with a drive pocket, indicated generally at 82, (FIGS. 1 and 5) of a generally channel shape to receive the slide member in mating engagement. Radial alignment of the slide member with the drive pocket 82 takes place when a latch member 83 (FIGS. 5 and 6) is received in releasable engagement with a catch member 84 pivotably mounted on the piston rod 86 of the hydraulic cylinder assembly 73. The catch member 84 is of a generally channel shape yieldably urged by a spring 87 connected to the carriage structure 35 into engagement with the catch 84 when the latch member is received therein. Laterally extended ears 88 on the catch member 84 may be initially engaged with the latch member 83 so as to permit manipulation of the cylinder assembly 73 to position the catch member for receiving therein the latch member.

Figure 12:
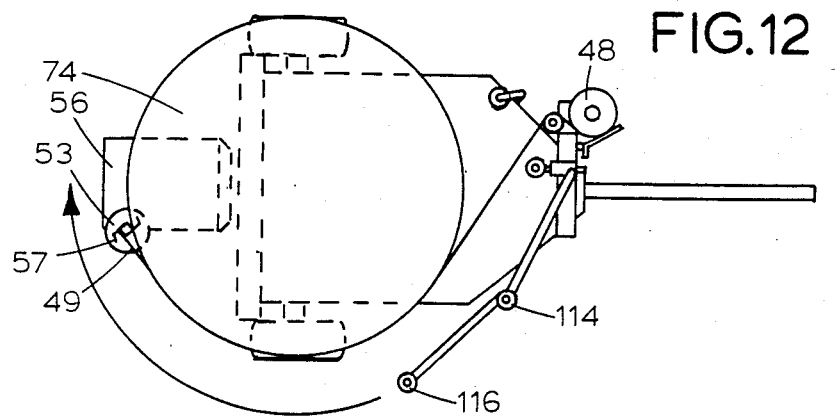

With the carriage structure 35 engaged with the platform 26, as above described, the carriage is rotatable with the platform. At this time the free end of the plastic sheet material 49 is held by the retaining fingers 57 on the combination unit 53 so that on rotation of the platform in a clockwise direction, as viewed in FIGS. 12 and 13, the plastic sheet 49 is unwound from the roll 48 and wrapped entirely about the periphery of the bale as illustrated in dotted lines in FIG. 13. The plastic is then torn or severed from the combination unit by means including a press roll mechanism 89 (FIGS. 1, 8 and 9).

The press roll mechanism 89 is mounted at the forward end of the machine main frame 21 and includes an upright shaft 91 having its lower end rotatably mounted on the frame 21 (FIGS. 8 and 9). An upright guide rod 92 is secured in a spaced parallel relation with the upright shaft 91. A press roll 93 is rotatably mounted on an upright support member 94 which is pivotally connected with the shaft 91 for extension and retraction relative to the shaft by a lever system 96. The lever system 96 includes a bottom lever 97 pivoted at one end to the lower end of the roll supporting member 94 with its opposite end pivoted in a bearing member 98 that is guidably received for up and down movement between the guide rod 92 and the shaft 91. A pair of upper levers 99 are pivotally connected for a hinged movement between the roll mounting member and the shaft.

This lever system is actuated by an operating lever 101 pivotally connected at one end to a fixed pivot 102 positioned between the lower ends of the shaft and guide rod and at its opposite end intermediate the ends of the lower lever 97. An actuating rod 103 is pivoted to the operating lever 101 with its upper end carried on a pivot 104 common to one of the levers 99 and to one end of a drive arm 106 the opposite end of which is pivoted to a linear power unit 107 which is pivotally supported on a bracket 108 secured to the upper ends of the shaft and guide rod. In response to the extension and retraction of the power unit 107 the drive arm 106 is pivoted on a fulcrum 109 carried on an upper lever 99. On retraction of the power unit the press roll mechanism 89 is folded or collapsed to its position shown in FIG. 8 and is extendable to the position therefor shown in FIG. 9.

Figure 13:
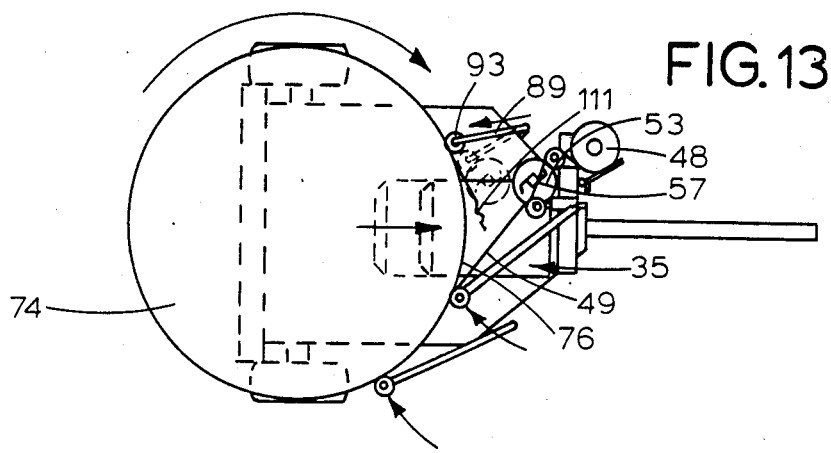

As shown in dotted lines in FIG. 13 on completion of the first wrap of plastic sheet material about the bale the lead end portion 111 of the plastic sheet is extended between the combination unit 53 and a peripheral portion of the bale 74. The press roll mechanism 89 is then extended to move the roller 93 into engagement with such lead end portion and to press such portion toward engagement with the bale 74. When the carriage structure 35 is retracted from its engaged position with the platform 26, as shown in full lines in FIG. 13, the extension of the press roll mechanism provides for a tearing of the lead end of the sheet material from the retaining fingers 57 on the combination unit 53. On severing of the plastic sheet from the combination unit the extension of the press roll mechanism may continue to press the resultant loose end of the plastic sheet against the ground side 76 of the bale 74.

Figure 14:
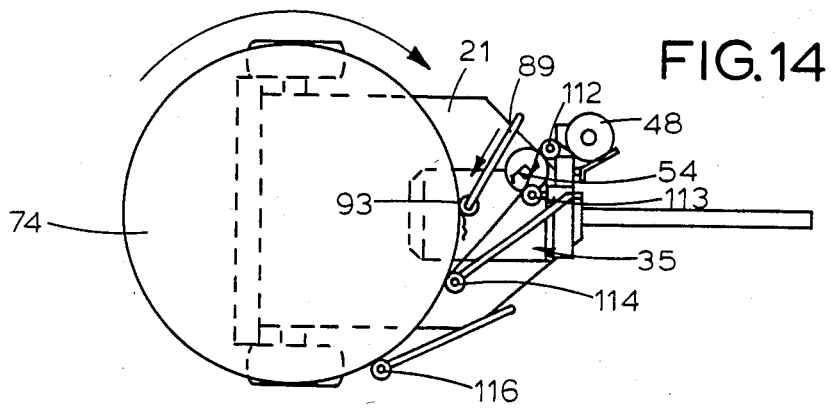

On movement of the carriage structure 35 to its disengaged position relative to the platform 26, and as seen in FIG. 14, the plastic sheet from the roll 48 is trained about a pair of guide rollers 112 and 113 arranged to opposite sides of the rotatable finger rod 54 for travel about the bale. On rotation of the bale through a second revolution a second wrap or length of the plastic sheet is placed about the bale in a covering relation with the first wrap or length of plastic material.

As shown in FIG. 14 during the second wrap of the plastic sheet around the bale 74 the sheet is pressed against the bale by a pair of rollers 114 and 116 supported on the main frame 21 for swinging movement into and out of engagement with the bale periphery. Referring to FIG. 7 the rollers 114 and 116 are diagrammatically illustrated and are seen to be actuated in response to the reciprocal movement of the carriage structure 35. A flexible member 117 shown as a chain has an intermediate portion adjustably attached to a block member 118 carried on the piston rod 86 of the hydraulic cylinder 73. The free ends of the chain member 117 are in turn connected to the roller swing arms 115 and 120. As a result, when the carriage structure 35 is engaged with the platform 26 the rollers 114 and 116 are in the positions shown in FIGS. 11 and 12 out of engagement with the bale periphery. When the carriage structure is disengaged from the platform the rollers are automatically moved into engagement with the bale periphery.

Figures 15, 16:
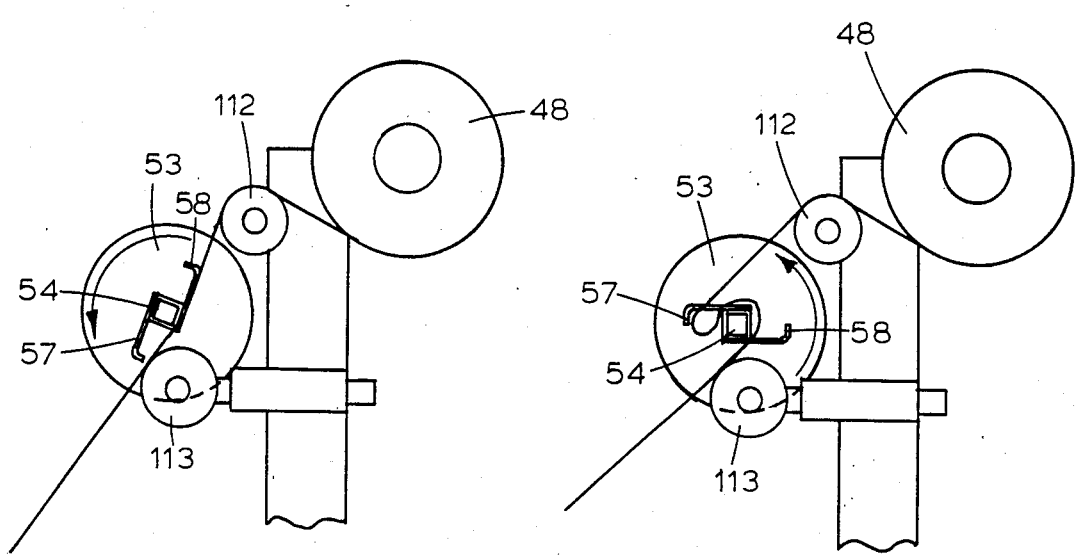

On completion of the second wrap, as diagrammatically illustrated in FIG. 15, the plastic sheet from the roll 48 extends between the guide rolls 112 and 113 and against a side of the shaft 54 and remains trained about the bale. To sever the plastic sheet from the bale is the function of the combination unit 53 the fingers 57 and 58 of which are located between the rollers 112 and 113, with the roller 113 in (FIGS. 1 and 2) being comprised of a plurality of roller segments 113a to provide spaces therebetween for turning movement of the fingers 57 and 58. Thus, on an initial rotation of the rod or shaft 54 the plastic sheet retaining fingers 57 are initially inserted through the sheet at the segmented roller 113 as shown in FIG. 15. On a continued rotation of the shaft the plastic sheet is penetrated a second time by the holding fingers 57 and for a first time by the severing fingers 58 all as shown in FIG. 16. With the combination unit 53 maintained stationary the platform is rotated in the clockwise direction as viewed in FIG. 17, resulting in a tearing or severing of the plastic sheet from the severing fingers 58 while providing for the retention of the new lead end of the roll 48 on the retaining fingers 57. The trailing portion of the severed plastic sheet is then pressed against the bale by the rollers 114 and 116 with the terminal end portions of the two wraps on the bale overlying each other at the ground side 76 of the bale. On completion of the terminal one-half revolution of the platform the ground side of the bale is properly located so that on tilting of the platform to unload the bale the ground side is in ground engagement whereby to maintain the terminal ends of the two wrappings against the bale. It is seen therefore that the new lead end of the plastic roll is in the position therefor illustrated in FIG. 10 so that the above operation of the wrapping machine can be repeated on a next bale to be wrapped. This double wrapping of a bale takes place automatically while the tractor operator remains seated on the tractor by means of a control system shown in FIG. 18.

Figure 18:
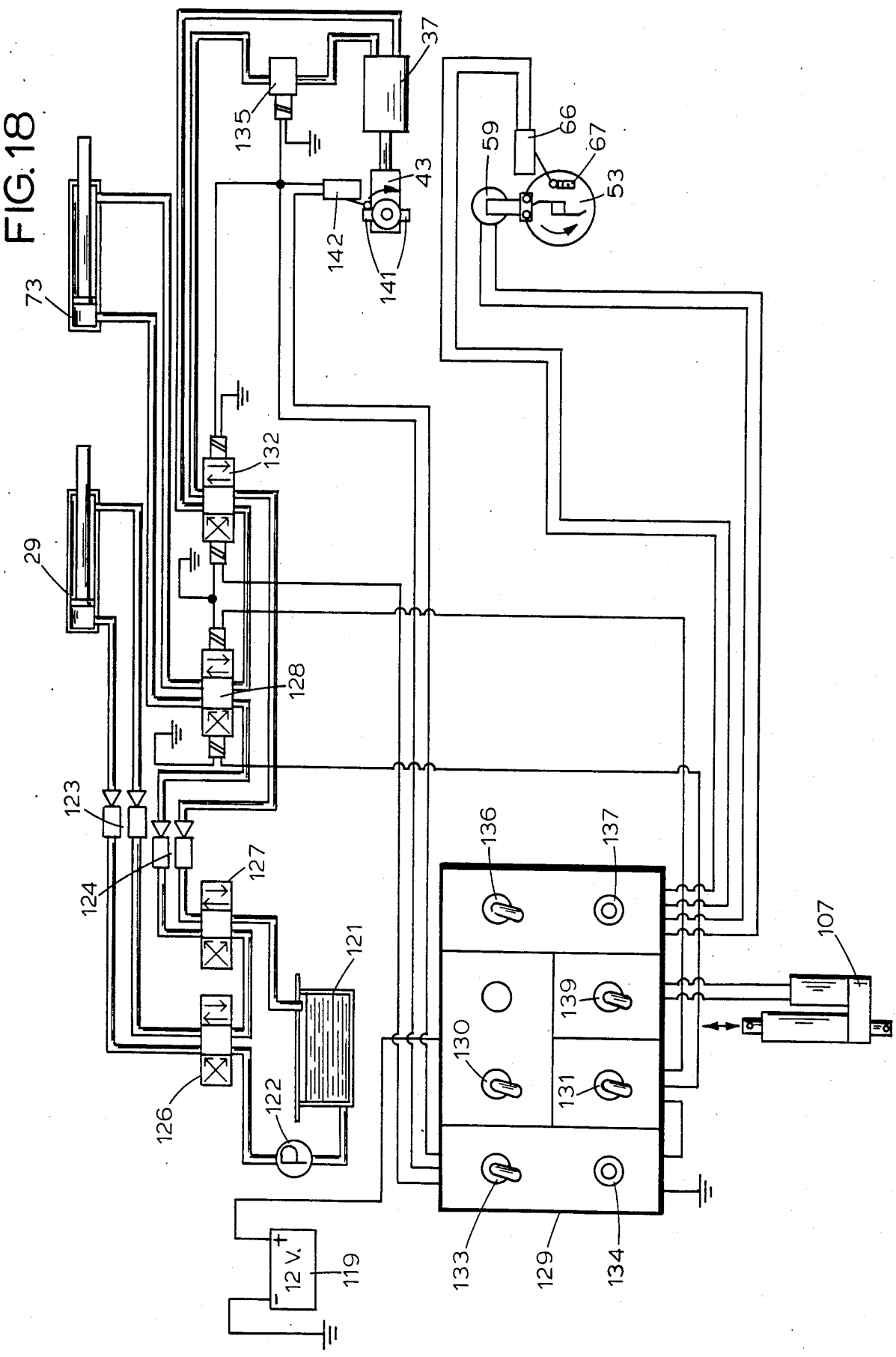
FIG. 18 is a schematic diagram of the electrical and hydraulic circuits for controlling the automatic operation of the bale wrapping machine.

Referring to FIG. 18, the tractor includes a 12 volt battery 119 and a reservoir of hydraulic fluid 121 supplied under pressure by pump 122 to a first and second pair of hydraulic hose couplers 123 and 124 through a first and second manually operated hydraulic valve 126 and 127, respectively. The two-way hydraulic cylinder 29 for tilting the bale platform is connected to the first pair of hose couplers 123 and is thereby actuated by first hydraulic valve 126.

Slide member 56 (FIG. 1) is moved by the double-acting hydraulic cylinder 73. Pressurized fluid is supplied to the cylinder 73 by way of solenoid-operated control valve 128. A control box 129, electrically connected to the battery 119 by way of power switch 130, is conveniently mounted on the tractor within easy reach of an operator and includes a plurality of switches for controlling the bale wrapping procedure. For example, a slide member switch 131 having an "In" and an "Out" position is electrically connected to control valve 128. When the switch 131 is in the "In" position, the control valve 128 will supply pressurized fluid to extend the slide member cylinder 73, thereby moving the slide member 56 closer to the bale platform 26 (FIG. 1). Alternatively, the slide member will be withdrawn when the switch 131 is in the "Out" position.

The supply of pressurized hydraulic fluid to the hydraulic drive motor 37 for rotation of the platform 26 is controlled by a second solenoid-operated control valve 132. Electrically connected to the control valve 132 is a reversible platform rotation switch 133 and a normally open contact switch 134 on the control box 129. As indicated by the labels on the face of the control box 129, switch 133 has a "Normal" and a "Stop/Reverse" position.

If the platform rotation switch 133 is in its "Normal" position, manual depression of the contact switch 134 will open control valve to supply pressurized fluid to drive motor 37 so as to rotate the gear reduction unit 43 and the bale platform in the clockwise direction when viewed from above. Upon completion of one-half of a complete rotation, contact block 141 will open limit switch 142 (FIGS. 3 and 18) which will close control valve 132, thereby interrupting the supply of pressurized fluid to the drive motor 37. Any transient drift of the drive motor 37 is prevented by a solenoid-operated cut-off valve 135, located between the control valve 132 and the motor 37, which is closed upon closing of limit switch 142. Of course, additional one-half rotations of the bale platform can be accomplished by additional depressions or actuations of the contact switch 134. Rotation can be stopped at any time by moving the platform rotation switch 133 to its "Stop/Reverse" position.

As previously described, the electric motor 59 rotates the combination unit 53. A combination unit rotation switch 136 and normally open contact switch 137 are electrically connected to the electric motor 59. Switch 136 has a "Normal" position and a "Stop/Reverse" position, as noted on the control box 129. When the switch 136 is in the "Normal" position, depression of contact switch 137 will cause the electric motor 59 to rotate the combination unit 53 in a counter-clockwise direction one full rotation until interrupted by opening of the limit switch 66 by contact with the block 67.

The control circuitry is completed by a two-position press roll switch 139 which controls the linear power unit 107 for extending and retracting the press roller (FIG. 1).

Although the invention has been described with respect to a preferred embodiment thereof, it is to be understood that it is not to be so limited since changes and modifications can be made therein which are within the full intended scope of this invention as described in the following claims.

We claim:

1. A machine for wrapping a round bale of crop material with a plastic sheet material comprising:
   (a) a main frame,
   (b) a bale supporting platform mounted on said frame for rotation about an upright axis,
   (c) means for rotating said platform,
   (d) means on said frame for rotatably supporting a roll of said plastic sheet material for rotation about an upright axis,
   (e) means on said frame adjacent the platform for automatically wrapping the plastic sheet about the periphery of a bale disposed in an upright position on said platform, including:
      (1) an upright unit for releasably retaining the lead end of the roll of plastic sheet to initiate a bale wrapping and for severing the plastic sheet on completion of a bale wrapping,
      (2) means movably mounting said upright unit on the frame and for moving it into and out of engagement with the platform,
      (3) means for engaging and disengaging said upright unit to and from the platform so that when engaged with the platform said unit rotates therewith having the lead end of the roll of plastic sheet retained thereby, being rotatable with the platform through a first revolution to wrap a first length of said plastic sheet about the bale, and
      (4) means on said frame for removing the lead end of said roll of plastic sheet from said upright member on completion of said first revolution,
      (5) said platform, on disengagement from said upright unit and with said plastic sheet released from the upright unit, being rotatable through a second revolution to wrap a second length of said plastic sheet about said bale in a covering relation with said first length, and
      (6) means on said frame for actuating said upright unit, on completion of said second revolution, to sever the plastic sheet from the bale concurrently with releasably retaining the next lead end of the roll to initiate the wrapping of a next bale.

2. A machine according to claim 1 for wrapping a round bale wherein:
   (a) the means for movably mounting said upright unit on the frame includes a carriage structure slidably supported on the frame for radial movement relative to the rotational axis of said platform,
   (b) the engaging means includes means on said platform for releasably receiving said carriage structure in locked engagement for rotation with said platform, and
   (c) the moving means includes means on the frame for moving said carriage structure into and out of said receiving means, when the carriage structure and receiving means are in radial alignment relative to the rotational axis of said platform.

3. A machine for wrapping a round bale according to claim 1, wherein:
   (a) said upright unit includes a post member rotatably mounted on said carriage structure,
   (b) a plurality of transversely opposite retaining and severing fingers spaced vertically of said post member and projected laterally from opposite sides thereof, with the retaining fingers on one side of the post member releasably holding the lead end of the plastic sheet during said first wrap about the bale and the severing fingers on the opposite side of the post member, on rotation of the post member when the second wrap about the bale is completed, severing the second wrap from the roll concurrently with piercing and retention of the next lead end of the plastic sheet by the retaining fingers.

4. A machine for wrapping a round bale according to claim 1, wherein:
   (a) said removing means includes an upright support member mounted on said frame adjacent said platform,
   (b) an upright roller,
   (c) a lever system pivotally interconnecting said roller and support member for movement of the roller toward and away from said platform, and
   (d) means for actuating said lever system, on completion of the first wrap about said bale, to move said roller against said first wrap at a position between the bale and said upright unit to remove the lead end of the roll from said upright unit and to press said removed lead end against the bale.

5. A machine for wrapping a round bale according to claim 1, including:
   (a) means supporting the main frame for travel over the ground,
   (b) means supporting the platform adjacent one end of the frame for movement about a horizontal axis from a vertical bale loading position outwardly of said one end to a horizontal bale wrapping position on said frame;

(c) bale engaging tines projected horizontally from the platform in the loading position therefor for insertion into the end of a bale having one side on the ground, and (d) means for moving said platform between the vertical and horizontal positions therefor, (e) said platform, in the horizontal position therefor, being initially rotated to locate the one side of the bale into a facing relation with said upright unit prior to rotation of the platform through said first revolution, whereby on completion of the second revolution the opposite ends of said first and second lengths of the plastic sheet are in an overlapping relation at the one side of the wrapped bale to maintain the plastic wrap about the bale when the bale is unloaded from the machine with said one side of the bale facing the ground.

6. A machine for wrapping a round bale according to claim 5, including:

(a) coacting means on the platform and frame for indicating the vertical bale loading position of the platform whereby the one side of the bale is spaced the same distance from the upright unit, when in the facing relation therewith, for bales of varying diameter.

7. A machine for wrapping a round bale according to claim 5, including:

(a) a hydraulic control system comprising of a power unit for rotating said platform, and a power means for said carriage structure, (b) an electrical power means for said actuating means, (c) an electrical power unit for said removing means, (d) an electric control system for said electrical power means and electrical power unit, and (e) a control unit connected in said hydraulic control system and electrical control system for selectively actuating said electrical power means and power units and hydraulic power means and power units.

* * * * *